United States Patent
Khan et al.

(10) Patent No.: US 6,272,226 B1
(45) Date of Patent: Aug. 7, 2001

(54) APPARATUS AND METHOD FOR MASKING AUDIO SIGNALS IN A SIGNAL DISTRIBUTION SYSTEM

(75) Inventors: Raheel Khan, Lake Forest, CA (US); William P. Lafay, Snellville, GA (US)

(73) Assignee: Scientific-Atlanta, Inc., Norcross, GA (US)

(*) Notice: Subject to any disclaimer, the term of this patent is extended or adjusted under 35 U.S.C. 154(b) by 0 days.

(21) Appl. No.: 08/825,910

(22) Filed: Apr. 2, 1997

(51) Int. Cl.[7] .......................................................... H04H 5/00
(52) U.S. Cl. ........................ 381/4; 381/3; 381/4; 381/15; 381/16
(58) Field of Search ................................. 381/3, 4, 15, 16

(56) References Cited

U.S. PATENT DOCUMENTS

| | | |
|---|---|---|
| 2,567,539 | 9/1951 | Aram . |
| 2,905,747 | 9/1959 | Kidd et al. . |
| 2,952,735 | 9/1960 | Weiss . |
| 3,059,054 | 10/1962 | Reiter . |
| 3,202,758 | 8/1965 | Brownstein . |
| 3,924,059 | 12/1975 | Horowitz . |
| 3,936,594 | 2/1976 | Schubin et al. . |
| 3,999,005 | 12/1976 | Dickinson . |
| 4,048,654 | 9/1977 | Wegner . |
| 4,075,060 | 2/1978 | Horowitz . |
| 4,139,866 | 2/1979 | Wegner . |
| 4,148,060 | 4/1979 | Hershberg . |
| 4,148,063 | 4/1979 | Chomet . |
| 4,246,440 | 1/1981 | Van Der Heide et al. . |
| 4,389,671 | 6/1983 | Posner et al. . |
| 4,398,216 | 8/1983 | Field et al. . |
| 4,410,911 | 10/1983 | Field et al. . |
| 4,471,379 | 9/1984 | Stephens . |
| 4,586,081 | 4/1986 | Arnaud et al. . |
| 4,589,127 | * 5/1986 | Loughlin ................................. 381/16 |
| 4,636,853 | 1/1987 | Forbes et al. . |
| 4,654,705 | 3/1987 | Forbes et al. . |
| 4,704,726 | 11/1987 | Gibson . |
| 4,712,240 | 12/1987 | Schnerk . |
| 4,821,097 | 4/1989 | Robbins . |
| 4,905,278 | 2/1990 | Parker . |
| 4,956,862 | 9/1990 | Robbins et al. . |
| 5,058,159 | 10/1991 | Quan . |
| 5,060,262 | 10/1991 | Bevins, Jr. et al. . |
| 5,144,666 | 9/1992 | Le Van Suu . |
| 5,159,631 | 10/1992 | Quan et al. . |
| 5,408,686 | 4/1995 | Mankovitz . |
| 5,471,531 | 11/1995 | Quan . |

* cited by examiner

*Primary Examiner*—Ping W. Lee
(74) *Attorney, Agent, or Firm*—John Eric West; Kenneth M. Massaroni; Hubert J. Barnhardt, III

(57) ABSTRACT

An apparatus and method is provided for transmitting "masked" stereo audio signals in a signal distribution network such as a cable television system within the bandwidth constraints of conventional frequency allocation schemes. In various embodiments, left and right stereo audio signal components (L+R and L−R) are used to amplitude modulate a carrier using independent sideband (ISB) modulation without the transmission of a pilot signal. A jamming signal or low bandwidth data signal may be transmitted in place of the normal pilot tone. Various aspects of the invention contemplate the use of Hilbert transforms to perform the ISB modulation and demodulation.

15 Claims, 16 Drawing Sheets

APPARATUS AND METHOD FOR MASKING AUDIO SIGNALS IN A SIGNAL DISTRIBUTION SYSTEM

BACKGROUND OF THE INVENTION

1. Technical Field

This invention relates generally to an apparatus and method for transmitting "masked" stereo audio signals in a signal distribution system such as a cable TV network. More particularly, the invention prevents the unauthorized reception of narrowband signals while minimizing bandwidth requirements needed for masking such signals.

2. Related Information

FIG. 1 shows the frequency spectrum of a conventional BTSC (Broadcast Television Standards Committee) encoded audio signal. Stereo signals consist of a left and a right speaker component, each of which is band-limited between 50 Hz and 14.5 Khz. The BTSC signal transmits the sum of the two components (L+R) 101 at baseband. The difference of the components (L−R) is amplitude modulated onto a suppressed carrier signal at twice the horizontal line frequency ($2f_h$, where the line frequency is 15.73 KHz) thus producing two sidebands 103 and 104. The L−R signal is usually DBX encoded before AM modulation in order to provide greater immunity to noise introduced by FM demodulation at the receiver. A pilot tone signal 102, which is phase-locked to the carrier signal, is transmitted at the horizontal line frequency ($f_h$).

At the receiving end, the L−R signal is AM demodulated and recombined with the L+R signal to generate the L and R audio signals. Conventional BTSC audio decoders lock on to the pilot tone 102 and re-generate the suppressed carrier signal; this pilot tone also indicates the presence of a stereo signal to BTSC decoders. In the absence of the pilot tone, BTSC decoders assume that only a monaural signal is transmitted.

It is often desirable in a cable television system to scramble or otherwise render unintelligible portions of the transmitted signal, including the audio signal, in order to prevent unauthorized reception. Various techniques for providing secure access to the audio portion of the transmitted signal have been devised. As one example, U.S. Pat. No. 4,956,862 to Robbins et al. describes a technique wherein the audio portion of the television signal is modulated at a frequency that is offset from the standard carrier frequency (e.g., 4.75 MHZ instead of 4.5 MHZ). Unfortunately, this technique has the disadvantage of increasing the amount of bandwidth required to carry the signal, and suffers from other side effects as well.

Other techniques, such as those exemplified by U.S. Pat. No. 5,159,631 to Quan et al., vary the frequency of the modulation carrier in a pseudo random fashion or use other means of scrambling the audio signal. Other methods make use of digital encryption techniques. However, such conventional approaches undesirably increase the overall bandwidth required to transmit the audio signal and require complicated circuitry. Accordingly, conventional techniques have been found to be unsatisfactory.

SUMMARY OF THE INVENTION

In certain embodiments of the present invention, an audio "masking" operation is performed at a headend along with video scrambling. The scrambled video signal is AM-VSB modulated, and the masked audio signal is FM-modulated and combined with the TV signal at IF. The TV IF signal is then upconverted to a desired channel for transmission across a network. At a customer's premises, a settop terminal descrambles the video signal and "demasks" the stereo audio signal.

At the transmitting end, the BTSC signal is split into a baseband L+R signal and a baseband (DBX encoded) L−R signal. These two signals are used to form an independent sideband (ISB) modulated signal containing information from the L+R signal on the lower sideband and information from the L−R signal on the upper sideband. The ISB modulated signal is combined with a video signal at a headend and transmitted over a network such as a cable TV distribution system. At the receiving end, the "masked" audio signal is demodulated and provided as an output to a user's television.

It is thus one object of the present invention to provide for the secure transmission and reception of BTSC encoded stereo audio signals over a cable TV network or other distribution system using a minimum of bandwidth.

It is a further object of the present invention to transmit narrow bandwidth signals in a secure manner within the constraints of the NTSC frequency allocation scheme.

In various aspects of the invention, a Hilbert transformation operation is used to perform the independent sideband modulation. A jamming or low bandwidth data signal may also be transmitted at a frequency location normally used for transmitting a pilot signal.

Other advantages and benefits of the present invention will become apparent through the following detailed description, figures, and the appended claims.

DETAILED DESCRIPTION OF THE PREFERRED EMBODIMENTS

Figure 1:
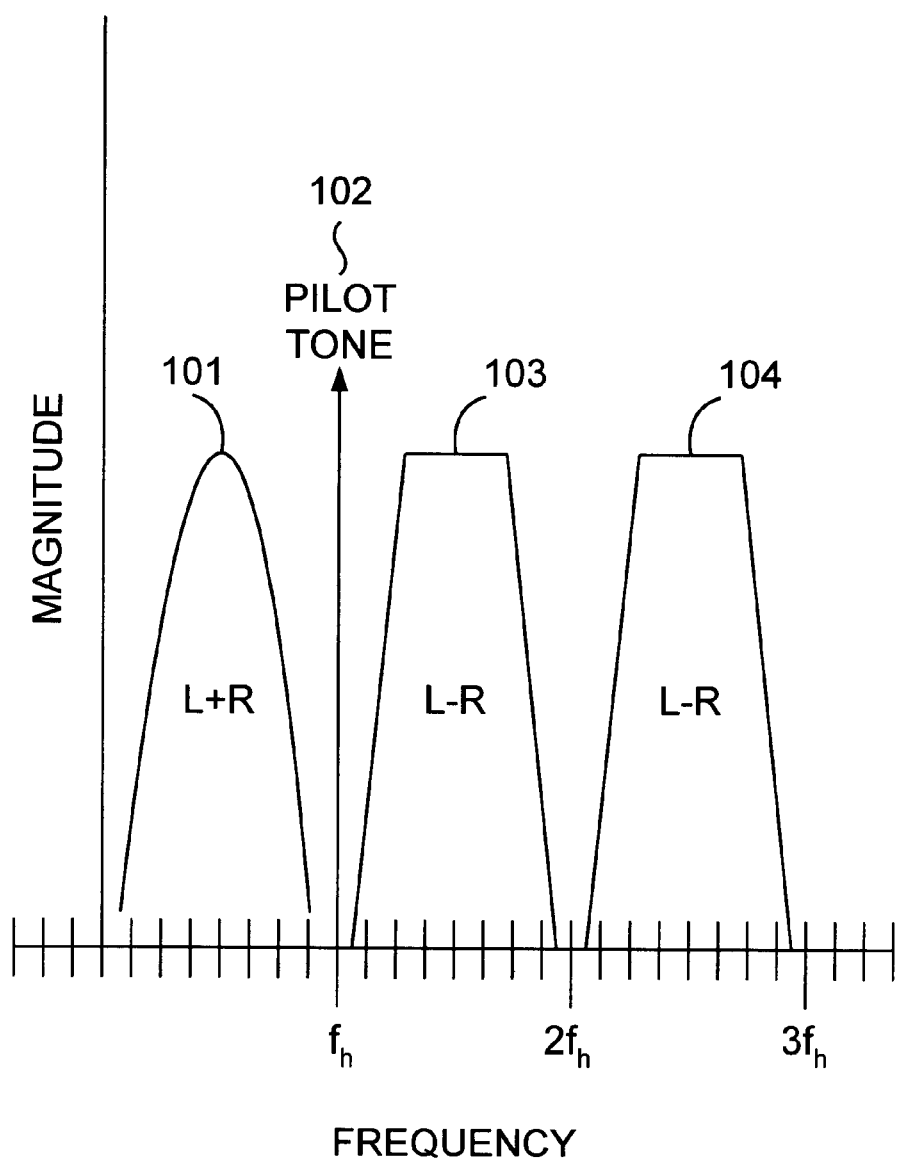
FIG. 1 shows a conventional frequency plan for a BTSC encoded stereo signal for transmission with a television signal.
Figure 2:
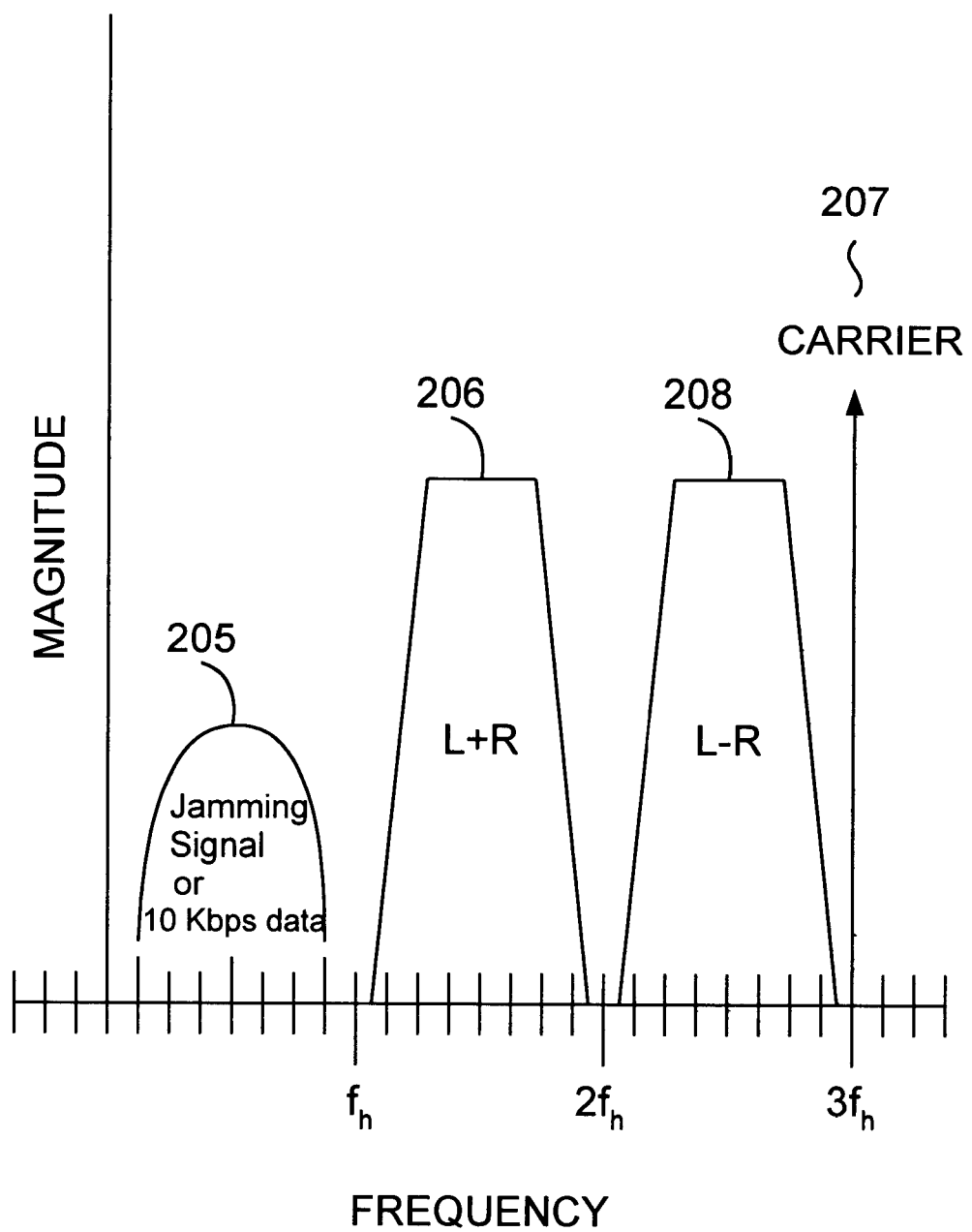
FIG. 2 shows a "masked audio" frequency plan according to the present invention, wherein L+R and L−R signals are transmitted using independent sideband (ISB) modulation along with a jamming signal.

FIG. 2 shows a frequency plan incorporating various principles of the present invention. In various embodiments, the L+R and L−R signals are separated from the conventional BTSC encoded signal and used to amplitude modulate a carrier signal using independent sideband modulation (ISB-AM), thus creating independent sidebands 206 and 208 in the space normally occupied by the L−R sidebands in the conventional BTSC encoded signal (see FIG. 1). A carrier signal 207 may be transmitted at $3f_H$. Additionally, a jamming signal 205 may be transmitted in the location conventionally reserved to transmit the L+R signal. In various embodiments, no pilot signal is transmitted (note absence of pilot signal 102 of FIG. 1).

In accordance with the signal plan shown in FIG. 2, conventional BTSC stereo decoders will not be able to decode the audio signal because, among other things, no pilot signal is transmitted, and further because the L+R and L−R components are not located in their normal location and are not modulated according to the conventional BTSC approach. Advantageously, however, the signal plan shown in FIG. 2 fits within the same bandwidth space required by the conventional BTSC signal and, accordingly, does not result in an increase in bandwidth. The scheme shown in FIG. 2 and variations thereof will be referred to generally as "masked audio".

Figure 3:
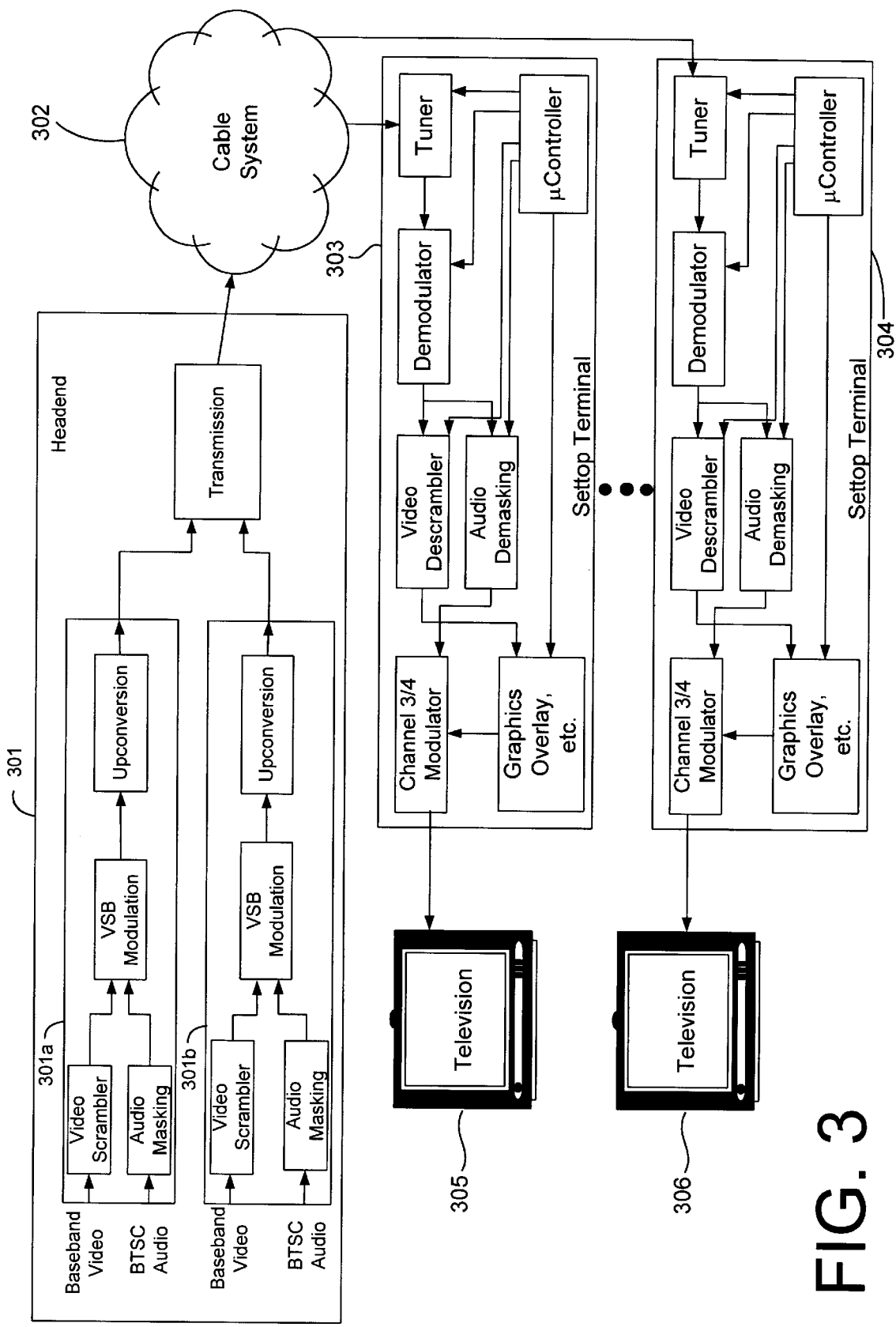
FIG. 3 shows a cable television system employing audio masking principles in accordance with various embodiments of the present invention.

FIG. 3 shows a system employing audio masking in accordance with various aspects of the present invention. A headend 301 includes two channel processing modules 301*a* and 301*b* each of which modulates and scrambles video and audio signals. Each module includes a video scrambler and an audio masking circuit which respectively receive baseband video and BTSC audio signals. The scrambled video and masked audio are fed to a vestigial sideband modulator followed by an upconverter. As is conventional, multiple programming channels are combined together for transmission across a cable system 302.

At the receiving end, settop terminals 303 and 304 include signal processing components which demodulate, descramble and "demask" the signals for presentation on televisions 305 and 306. The present invention provides a novel and useful means for masking the BTSC stereo audio signal so that unauthorized persons cannot hear the audio signal.

Stereo Signal Recovery

Figure 4:
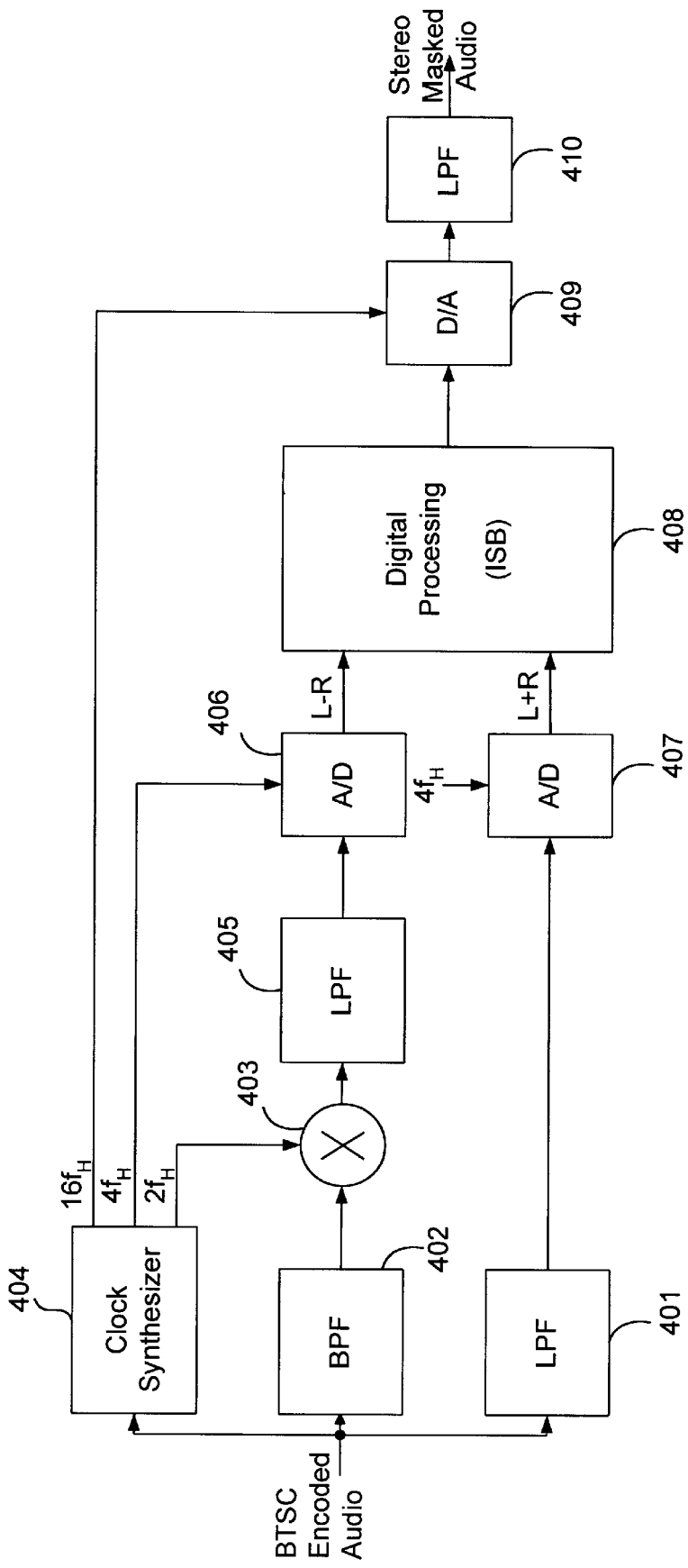
FIG. 4 shows in simplified form how a BTSC encoded stereo audio signal can be "masked" for transmission.

FIG. 4 is a simplified block diagram of an audio masking circuit which employs various principles of the present invention. The first step in various embodiments is the recovery of the separate L+R and L−R stereo signals from the BTSC encoded audio signal. A BTSC encoded audio signal (see FIG. 1) is input to a lowpass filter 401, a bandpass filter 402, and a clock synthesizer 404. Lowpass filter 401 recovers the L+R signal using a stop band of about 14.5 Khz. These types of filters are common in BTSC receivers.

The AM modulated L−R signal is isolated in bandpass filter 402 (passband: 17 Khz to 46 Khz). Both BPF 402 and LPF 401 preferably have less than 0.5 dB ripple in the passbands. After the AM-modulated component has been isolated, it is demodulated by mixing it with a $2f_H$ carrier in mixer 403. The mixer output is then lowpass filtered in LPF 405 to isolate the L−R component (LPF 405 also has a passband edge at 14.5 KHz). Preferably, LPF 405 provides a gain of 0.5 to compensate for the gain introduced in the mixing process. The L−R signal preferably retains DBX encoding for better noise immunity.

The recovered L−R and L+R signals are digitized using A/D 406 and A/D 407 respectively (LPFs 401 and 402 also serve as anti-aliasing filters). The sampling clock for the A/Ds is $4f_H$. The sampling clock is phase-locked with the incoming pilot tone. The sampled L+R and L−R signals are then "masked" in digital processing circuit 408 which includes an ISB modulation function. Following signal processing in circuit 408, the resulting signal is converted back to analog in D/A 409 and low-pass filtered in LPF 410. The D/A sampling clock can be 16 times the $f_H$ tone. The output of LPF 410 is a masked audio signal (see FIG. 2) which can be modulated onto the audio subcarrier and added to the (VSB modulated) TV signal at IF (see FIG. 3).

The clock synthesizer 404 shown in FIG. 4 locks onto the $f_H$ pilot tone and generates phase and frequency locked clocks for the system. In addition to the A/D clock and the D/A clocks, it generates a high speed (50 MHZ or so) digital clock for digital processing circuit 408, which need not be phase-locked with the $f_H$ pilot tone, and may be derived from a crystal oscillator. The clock synthesizer also generates a $2f_H$ signal which can be used to demodulate the L−R component.

The process of separating the L+R and L−R signals could be carried out entirely in the digital domain by digitizing the BTSC signal at the input of the system and carrying out the filtering and mixing operations in the discrete-time domain. However, partitioning the system as illustrated reduces the amount of digital processing required, making it possible to carry out all of the digital processing on a single DSP. Field-programmable gate-arrays (FPGAs) or high complexity programmable logic devices (HCPLDs) can also be used to carry out the digital processing.

Figure 5:
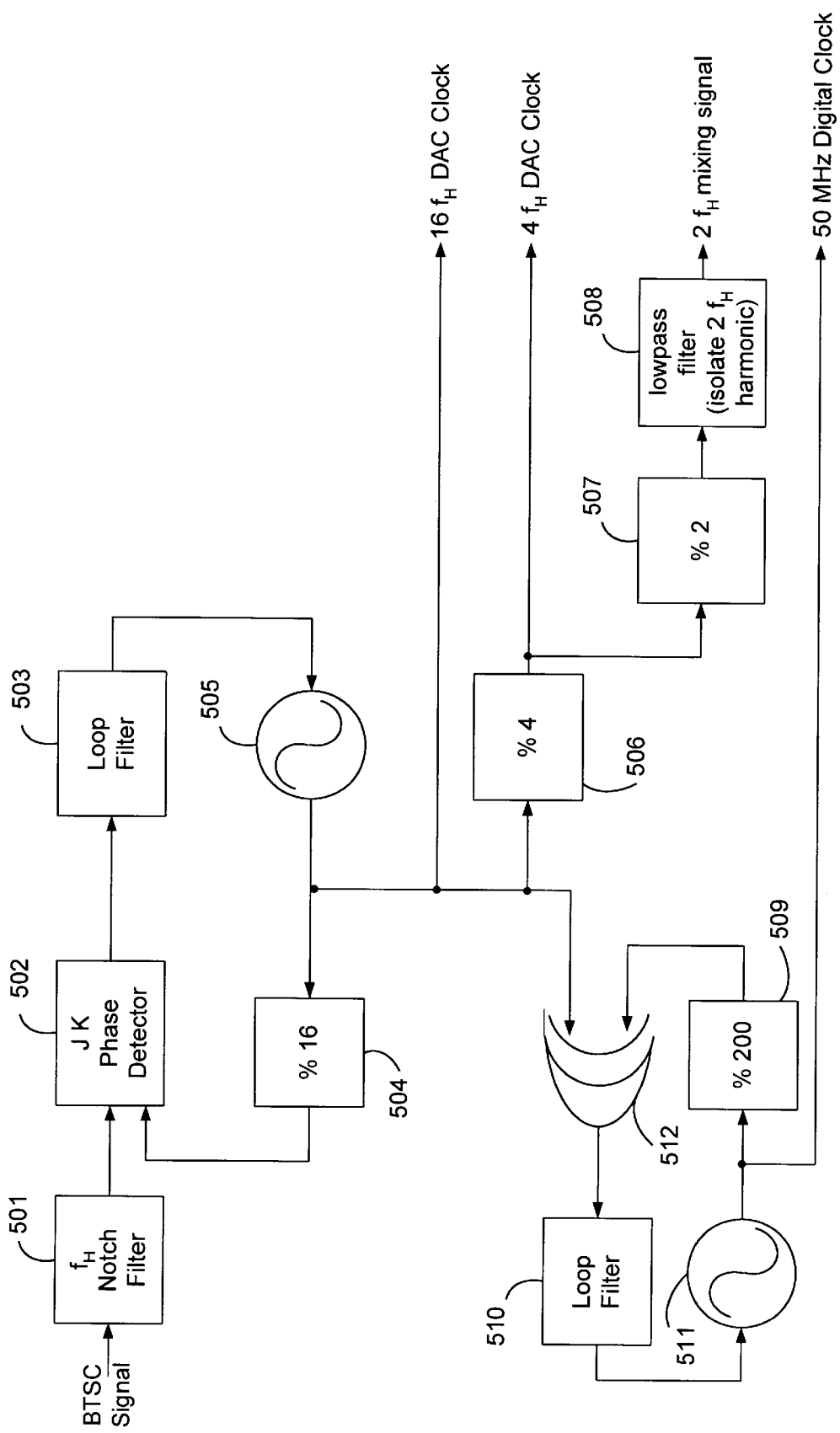
FIG. 5 shows one possible implementation of the clock synthesizer 404 of FIG. 4.

FIG. 5 shows one possible circuit for clock synthesizer 404. The circuit of FIG. 5 comprises a dual-loop PLL. The circuit includes two voltage controlled oscillators 505 and 511, and a phase detector 512. Any scheme for clock generation can be used. In practice, many harmonics of the pilot tone and several high speed clocks are readily available in headend modulators.

The L+R and L−R signals are sampled at $4f_H$, which is greater than twice the minimum sampling rate required to prevent aliasing. Because these signals are preferably oversampled, the anti-aliaing filter requirements (e.g., LPFs 401 and 405 in FIG. 4) can be simplified. The sampled signals are lowpass filtered to filter out the residual noise in the stop-band. Because the analog anti-aliasing filters preferably have a stop-band attenuation of greater than 55 dB, the digital lowpass filters can be simplified. The combination of analog anti-aliasing filters and digital lowpass filters should provide 60 dB of attenuation in the signal stop-band (approximately ¼ the sampling frequency and higher). The outputs of the lowpass filter are decimated to reduce the processing requirements for the elements which follow them.

Audio Masking Operation

A detailed description of the processing performed in signal processing circuit 408 of FIG. 4, including independent sideband modulation using Hilbert transforms, will now be provided with reference to FIG. 6 and FIGS. 7A to 7J. A brief theoretical background explanation will first be provided to aid in understanding various principles of the invention.

The Fourier transform of an arbitrary real signal is complex. The real part of the complex Fourier transform is symmetrical around zero-frequency. The imaginary part of such a Fourier transform is anti-symmetrical about zero-frequency. The Fourier transform of an even, real function is symmetrical about the f=0 axis while the frequency spectrum of an odd, real function is anti-symmetrical about the same axis.

It is possible to isolate either the positive frequency component or the negative frequency component of a real signal by using Hilbert transforms. A Hilbert transform has the following frequency response:

$$H_{Hilbert}(\Omega) = j\, sgn(\Omega)\Omega \quad (1)$$

The function $sgn(\Omega)$ represents the sign of $\Omega$ in equation (1). The impulse response of a Hilbert-transformer is given by:

$$h_{Hilbert}(t) = 1/\pi t \quad (1b)$$

Since the impulse response of a Hilbert transformer has an infinite discontinuity at t=0, analog realizations of a Hilbert transformer are difficult to realize. The discrete-time Hilbert transformer has a periodic frequency response with a period $2\pi$. The impulse response of the discrete-time Hilbert transformer is given by:

$$h_{Hilbert}[n] = \sin^2(\pi n/2)/(\pi n/2) \quad (1c)$$

The discrete-time Hilbert transform is zero for n=0, and has a continuously decreasing amplitude for n 0. Discrete-time Hilbert transformers can be realized using finite-impulse-response (FIR) filters.

The effect of filtering a signal with a Hilbert transformer is to multiply the positive frequency component of the input signal by "−j" and the negative frequency component by "j".

The frequency spectrum of any signal can be represented by a positive frequency component and a negative frequency component. Let $X_p(\Omega)$ and $X_n(\Omega)$ be the Fourier transforms of the positive frequency component and the negative frequency component of a signal x(t). The Fourier transform of x(t), $X(\Omega)$, can be represented as:

$$X(\Omega) = X_p(\Omega) + X_n(\Omega) \quad (2)$$

The frequency spectrum of a Hilbert-transformed signal, $X_h(\Omega)$ is given by:

$$X_h(\Omega) = -jX_p(\Omega) + jX_n(\Omega) \quad (3)$$

The positive frequency component of a signal can be isolated by adding to the signal a "Hilbert-transformed" version of itself, multiplied by "j".

$$X(\Omega) + j\, Xh(\Omega) = (X_p(\Omega) + X_n(\Omega)) + j(-jX_p(\Omega) + jX_n(\Omega)) = 2X_p \quad (4)$$

In an analogous manner, the negative frequency component can be isolated by subtracting $j\, X_h(\Omega)$ from $X(\Omega)$. Signals which contain only positive frequency components, or only negative frequency components are called "analytic signals".

For convenience, the L+R signal will be referred to as signal A and the L−R signal will be referred to as signal B. An analytic version of signal A, which contains only negative frequency components, can be formed using the following Hilbert transform relationships. The notation $A_n$ will be used to refer to the analytic version of the signal A (i.e., the version containing only negative frequency components). $A_n$ can be expressed as:

$$A_n = A - jA_h \quad (5)$$

where $A_h$ is the Hilbert-transformed version of A.

Similarly, the positive frequency components of signal B, which will be referred to as $B_p$ can be expressed using the following relationship:

$$B_p = B + jB_h \quad (6)$$

where $B_h$ is the Hilbert-transformed version of B.

The two analytic signals can be combined to form a complex independent sideband signal which contains information from L+R on the lower sideband and L−R on the upper sideband. This signal will be referred to as C:

$$C = A_n + B_p = (A - jA_h) + (B + jB_h) \quad (7a)$$

$$= (A+B) + j(B_h - A_h) \quad (7b)$$

$$= (A+B) + j(B-A)_h = I + jQ \quad (7c)$$

Going from equation 7b to 7c takes advantage of the fact that a Hilbert transform operation is a linear one. The real and imaginary components of the complex signal C have been relabelled I and Q, respectively. Q can be formed by taking the Hilbert transform of the difference of L−R and L+R, and I can be formed by taking the sum of L+R and L−R.

Figure 6:
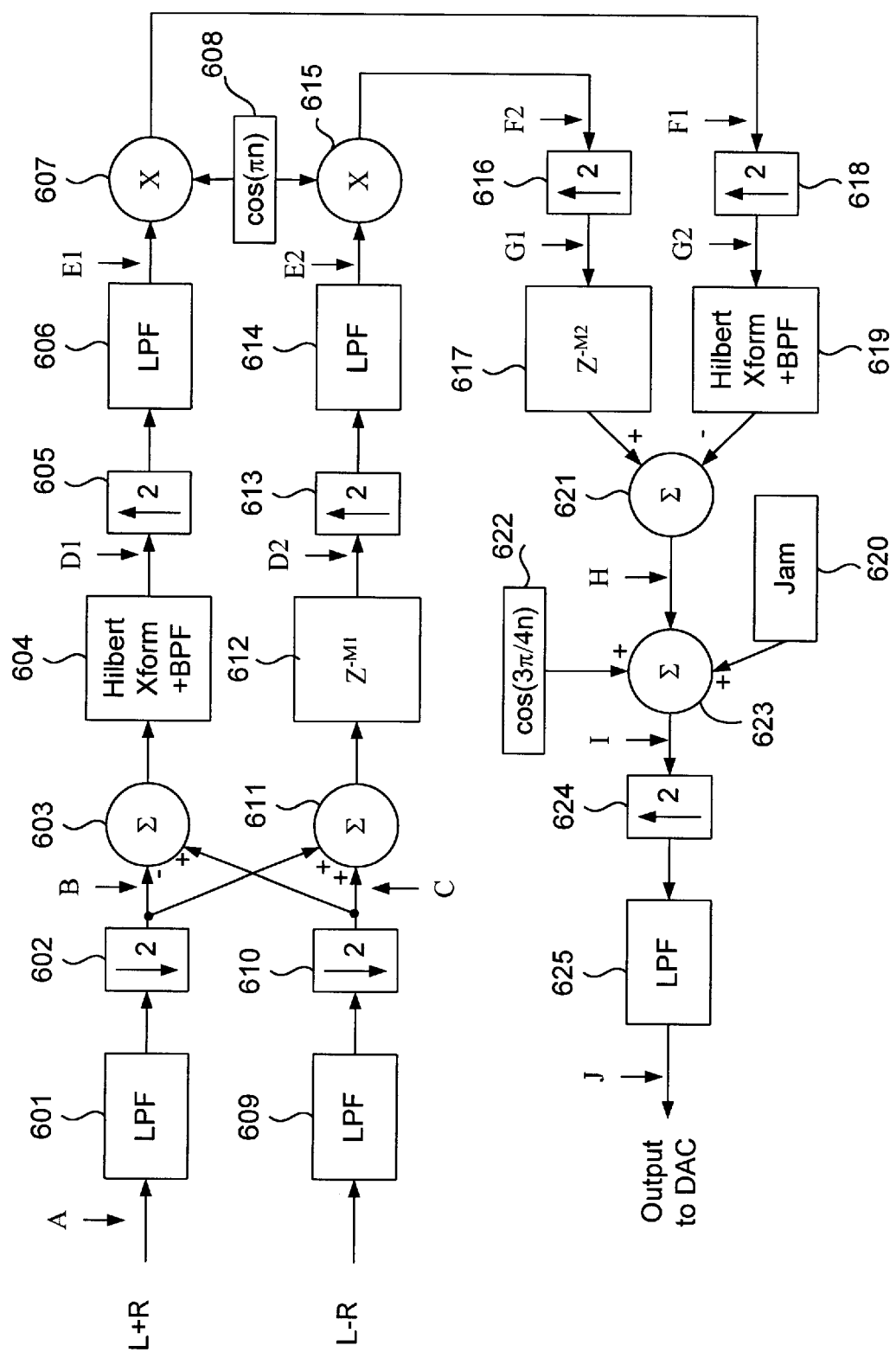
FIG. 6 shows an audio masking circuit employing various principles of the present invention.

FIG. 6 shows a circuit which can be used to perform audio masking in accordance with various aspects of the present invention. FIGS. 7A to 7J show spectra for signals taken at points A through J in the circuit of FIG. 6. In the figures, $\omega_c$ is used to denote the cutoff frequency of a filter and $\omega_p$ is used to denote the passband edge of the filters. Unless otherwise indicated, filter gain is assumed to be unity and the stop band is assumed to be at least 60 dB below the passband. FIR filters are preferred for stability and phase linearity. For some filters, the form of the filter is specified by indicating the length of the filter. For example, the notation L=2M+1 where M is an integer constrains the length of the filter to be an odd integer. FIR filters of this type have a group delay of M samples. Elements labeled $Z^{-M}$ introduce a delay of M samples.

Figure 7A:
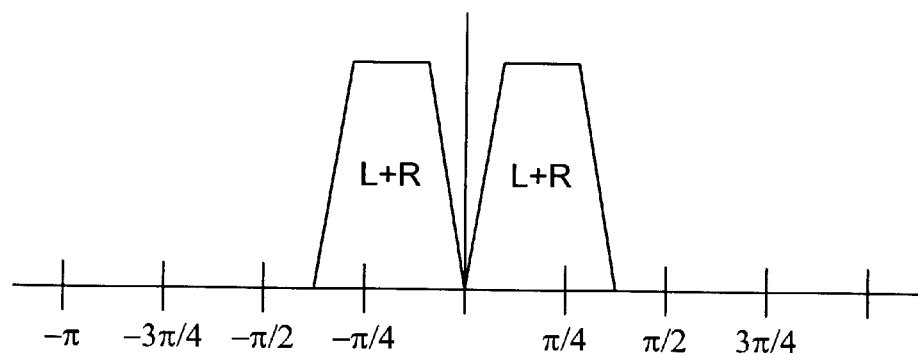
FIG. 7A shows a frequency spectrum of a baseband L+R signal.
Figure 7B:
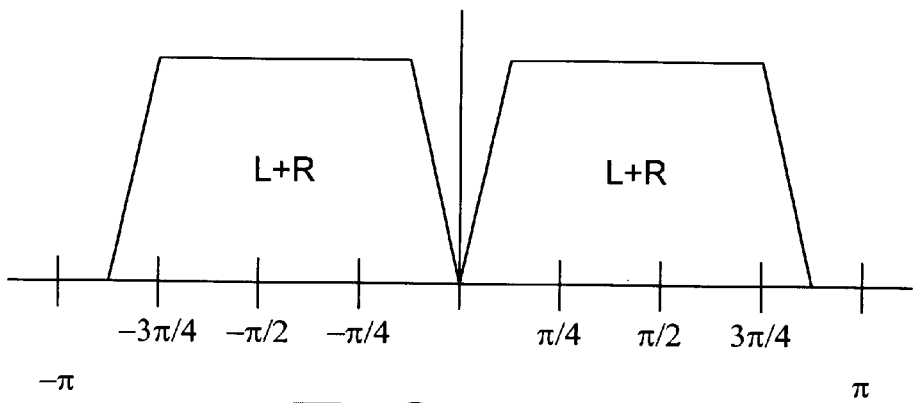
FIG. 7B shows a frequency spectrum of a L+R signal after decimation.
Figure 7C:
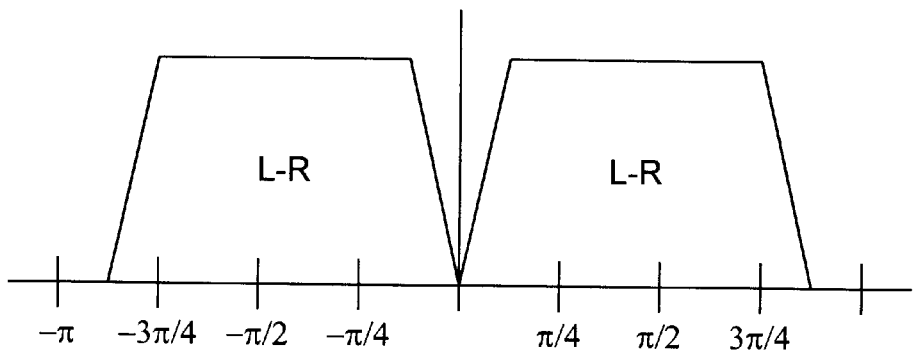
FIG. 7C shows a frequency spectrum of a L−R signal after decimation.
Figure 7D:
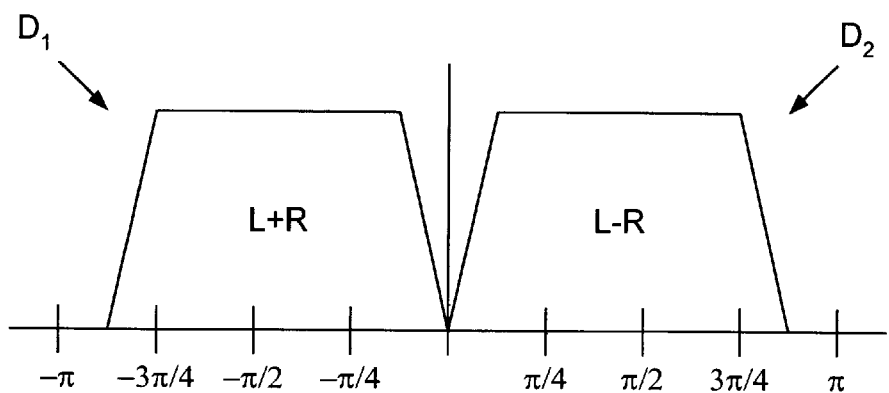
FIG. 7D shows a frequency spectrum of an independent sideband (ISB) modulated signal (I+jQ).

Beginning with the left side of FIG. 6, the recovered L+R signal (FIG. 7A) is input to a low pass filter 601 (($\omega_p$=0.46π, $\omega_c$=0.5π), followed by decimation by 2 in decimator 602 (see FIG. 7B). Similarly, the recovered L−R signal is input to a low pass filter 609 having the same characteristics, followed by decimation in decimator 610 (see FIG. 7C). The decimated filtered signals are provided to respective summers 603 and 611. The L+R component is subtracted in summer 603 while the others are added.

The output of summer 603 is provided to a Hilbert transformer 604 ($\omega_p$0.003π, 0.92π) preferably having a length of 2M1+1 (group delay of M1 samples) which produces a quadrature component which is delayed by M1 samples in relation to its inputs. The real component must, therefore, also be delayed by M1 samples, as shown by delay element 612. Because the passband of the Hilbert transformer 604 extends from 50 Hz to 14.5 Khz, the order of the Hilbert transformer is relatively high. A length 301 Hilbert transformer can be implemented using a least-squares approach which satisfies the requirements of the audio signal. The spectrum output from Hilbert transformer 604 is shown by D1 in FIG. 7D, and the spectrum output from delay element 612 is shown by D2 in FIG. 7D.

Figure 7E:
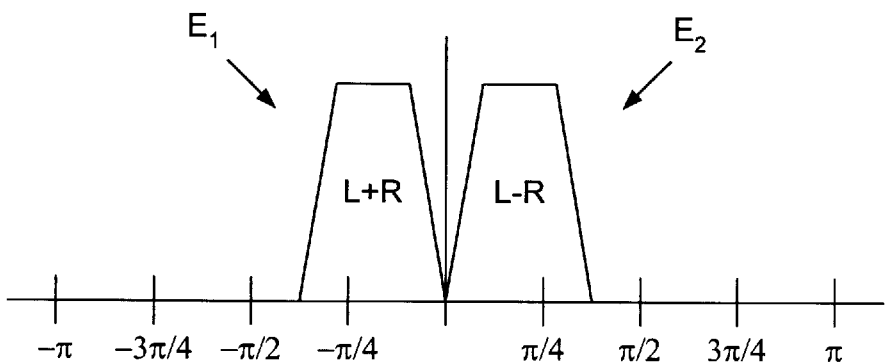
FIG. 7E shows a frequency spectrum of an ISB signal after interpolation by two (I1+jQ1).

The independent sideband signal C is interpolated by two by inserting zeros between each sample (elements 605 and 613) and filtering the result in low pass filters 606 and 614, respectively ($\omega_p$=0.46ω, $\omega_c$=0.5π, gain=2). The interpolating filter is of a relatively high order since the passband edge and Nyquist frequency of the independent sideband signal are relatively close. Even so, a half-band filter can be implemented which uses 26 fourteen bit coefficients to accomplish the interpolation. Further optimization of the half-band filter is possible. The expected frequency response of the interpolated independent sideband signal is shown in FIG. 7E.

Figure 7F:
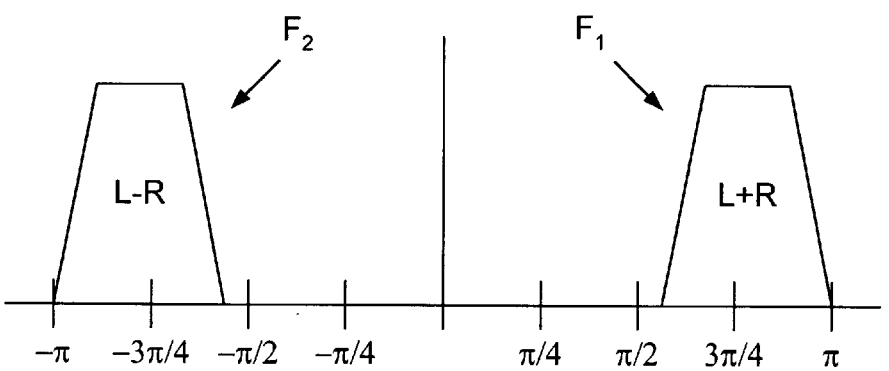
FIG. 7F shows a frequency spectrum of the signal in FIG. 7E after mixing with cos $(\pi/2n)$(I2+jQ2).
Figure 7G:
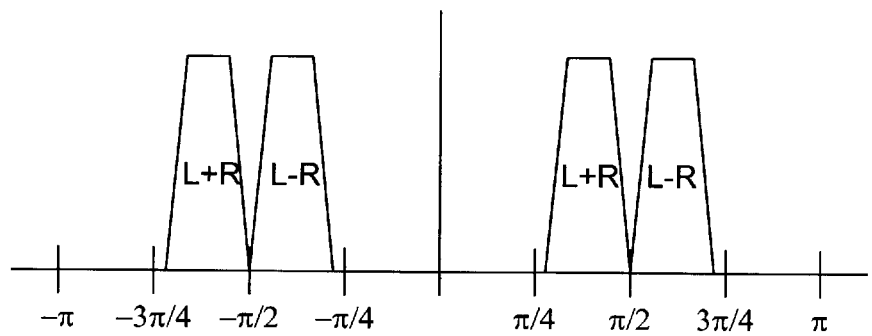
FIG. 7G shows a frequency spectrum of the signal of FIG. 7F after rate expanding (i.e. inserting zeros between each sample of 7F).

The interpolated signal is then multiplied by cos(πn) by generator 608 and multipliers 607 and 615. The resulting spectrum is shown in FIG. 7F. The interpolated, mixed independent sideband signal (I2+jQ2) is then rate expanded by two (elements 616 and 618), resulting in the frequency spectrum shown in FIG. 7G. Note that the upper sideband of this signal is centered around ω=π/2, which corresponds to 2$f_H$ at the new sample rate.

The upper sideband of (I3+jQ3) can be isolated using Hilbert transforms. Using C3 to designate I3+jQ3, the upper sideband $C_u$ can be formed by:

$$C_u = C3 + jC3_h, \qquad (8a)$$

where $C3_h$ is the Hilbert transformed version of C3

$$= (I3 + jQ3) + j(I3_h + jQ3_h) \qquad (8b)$$

$$= (I3 - Q3_h) + j(Q3 + I3_h) \qquad (8c)$$

Figure 7H:
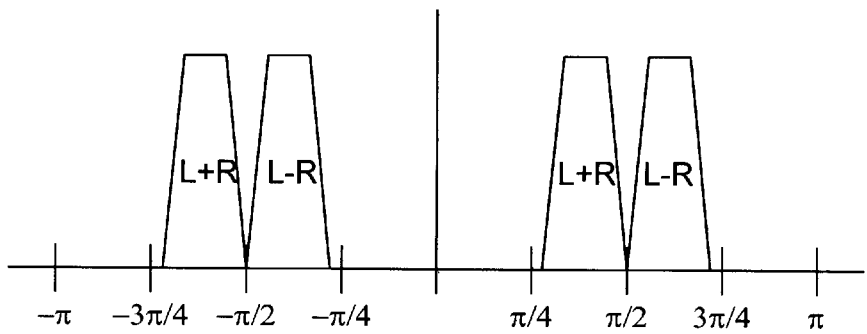
FIG. 7H shows the upper sideband of the signal in FIG. 7G isolated by passing it through a Hilbert transform filter pair. The real part of the result is retained.
Figure 7I:
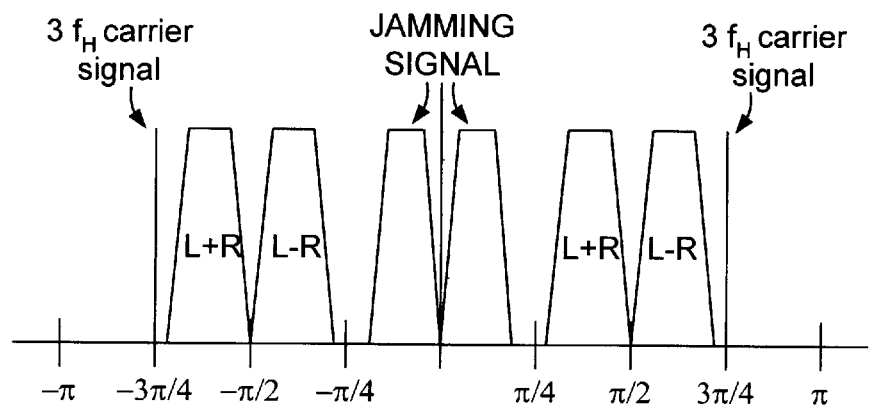
FIG. 7I shows the signal of FIG. 7H after adding a jamming signal and the $3f_H$ signal.

The real part of $C_u$ can be used to form a real signal with symmetrical frequency response. The entire operation of first multiplying by cos(πn), rate-expanding and Hilbert transformation is equivalent to interpolation by two and mixing with $e^{j\pi n}$. The advantage of using this approach is that the Hilbert transform approach is less computationally demanding. The interpolation and mixing operations can be performed using only a length 13 Hilbert transformer 619 (L=2M2+1, $\omega_p$=0.25π, 0.75π) which can be implemented using only three 12 bit coefficients. The frequency response of the interpolated, modulated signal is shown in FIG. 7H.

The foregoing description explains how the independent sideband modulated signal can be formed using Hilbert transforms. A baseband jamming or audio barker signal (620) and a reference pilot tone (element 622) is then added to the resulting signal, producing the masked signal shown in FIG. 7I. The pilot tone is placed at π=3π/4 which corresponds to 3$f_h$ after D/A conversion. The pilot tone could also be placed at 2$f_H$ instead, but placing the tone at 3$f_H$ simplifies the design of the clock-recovery circuit at the receiver.

Figure 7J:
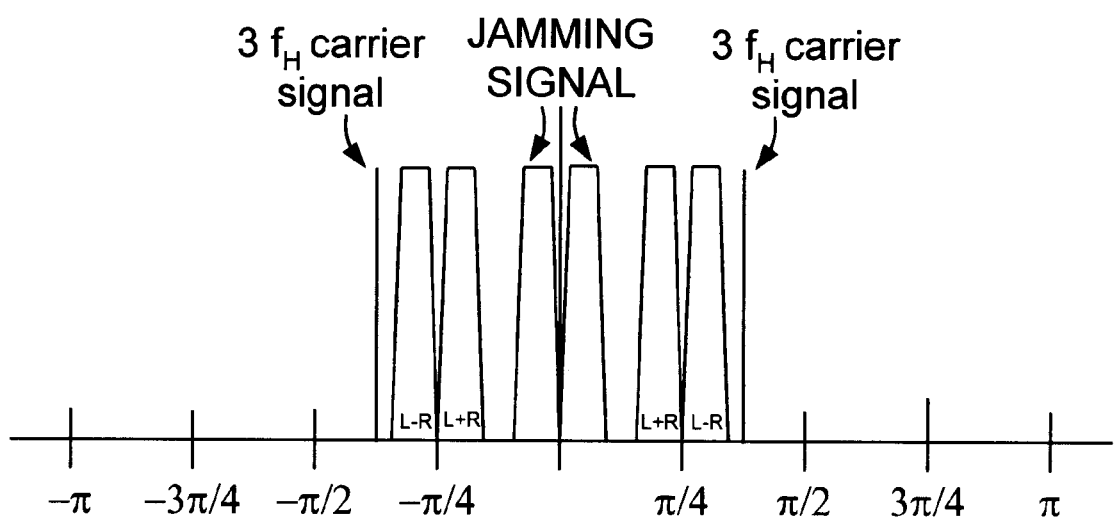
FIG. 7J shows the signal of FIG. 7I after interpolation.

Finally, the audio signal is interpolated by two (element 624) and passed through a low pass filter 625 ($\omega_p$=0.375π, $\omega_c$=0.625π, gain=2). There are two reasons for this. First, all DACs exhibit a sin(x)/x amplitude distortion on the reconstructed spectrum. The distortion is fairly small at frequencies less than ¼ the sampling rate. The interpolation filter also predistorts the signal by giving it a x/sin(x) shape. The combination of the predistortion and oversampling virtually eliminates any DAC artifacts. The second reason is that the analog reconstruction filter (following DAC 409 in FIG. 4) is simplified greatly because of the oversampling. A fifth order elliptic filter is sufficient for this purpose. The frequency response of the signal at the output of the digital processing circuit is shown in FIG. 7J. As explained above, all of the operations may be carried out using a single floating point or fixed point DSP processor.

Audio Demasking Operation

Figure 8:
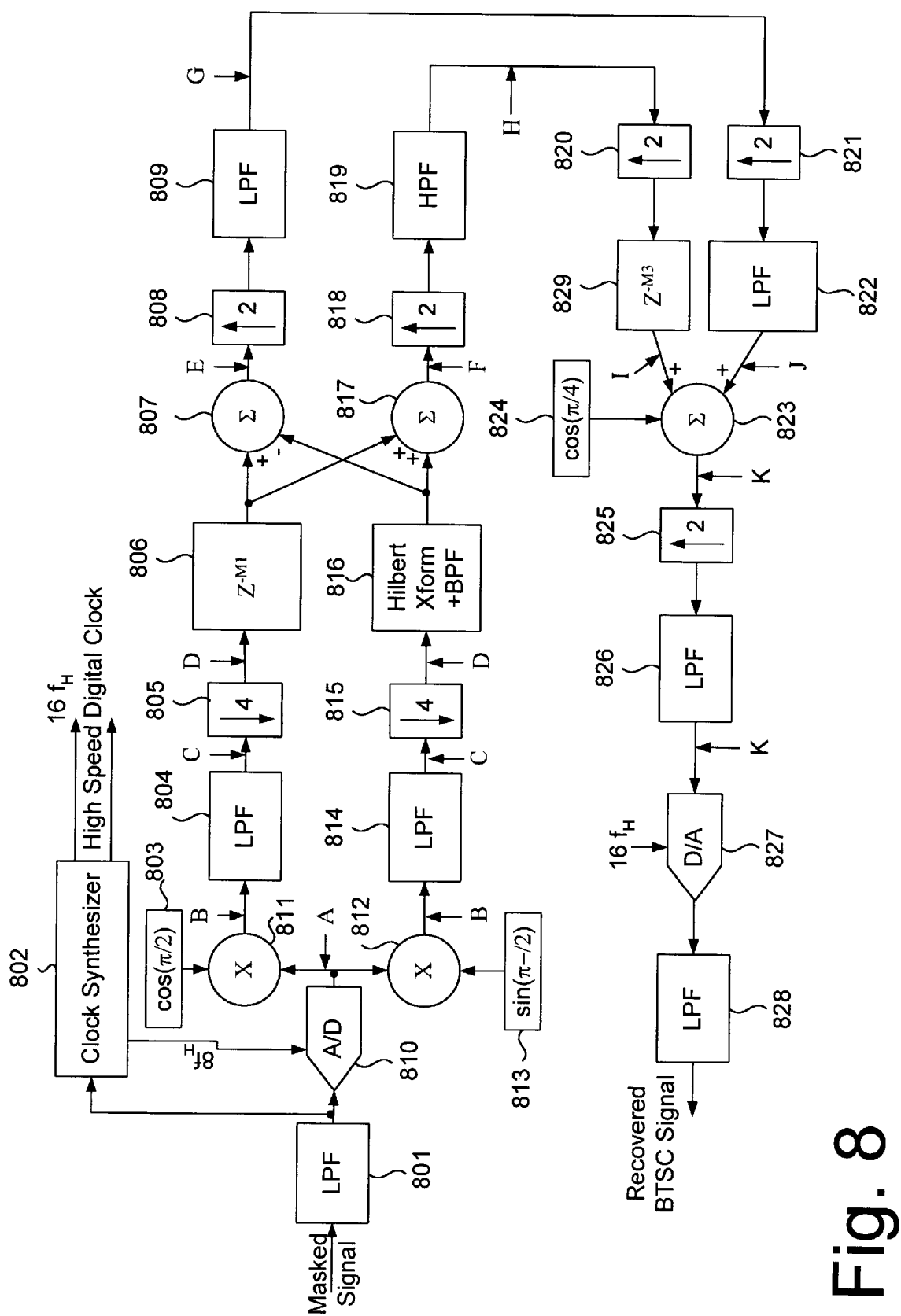
FIG. 8 is a block diagram of an audio demasking circuit employing various principles of the present invention.

The audio demasking operation can be carried out using a monolithic ASIC with very few external components. FIG. 8 shows a circuit which can be used to perform the audio demasking operation, and FIGS. 9A to 9L show frequency spectra for various labelled portions of the circuit in FIG. 8.

Figure 9A:
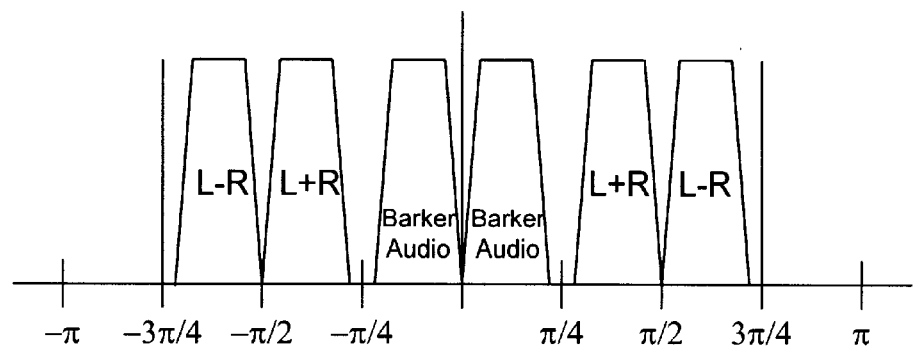
FIG. 9A shows a frequency spectrum of a masked audio signal.

The signal input to the audio demasking circuit of FIG. 8 is assumed to be the same as the output of the masking circuit (e.g., the headend of a cable TV distribution system). The signal is first passed through a low pass filter 801 (passband 47 Khz, stop-band edge 63 Khz) to band limit it to below 50 Khz. It is also assumed that the signal has been gain adjusted so that the dynamic range of the A/D 810 can be fully utilized. The signal is sampled in A/D 810 using for example 12 bits operating at 8 $f_H$ (i.e., 126 KS/sec). A/D 810 should provide at least 10 effective bits of resolution at this sampling rate. There is an integral and nonlinearity requirement of ½ LSBs or better. All of the spurious signals introduced by A/D 810 should be 55 dBC or lower. The spectrum at point A in the circuit is shown in FIG. 9A.

Figure 9B:
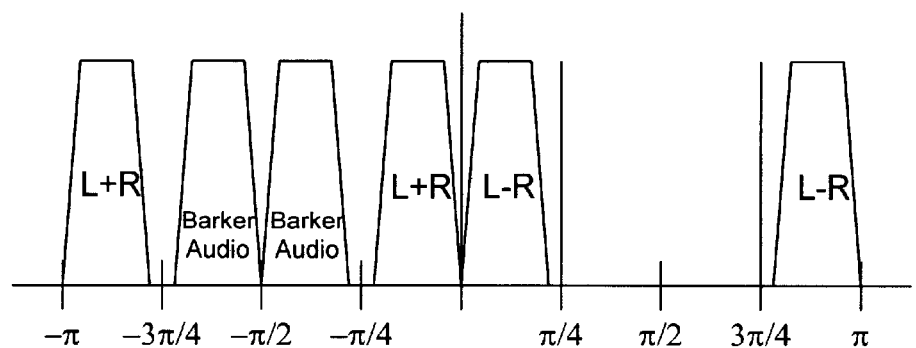
FIG. 9B shows a frequency spectrum of a masked signal after injection with $_e$-$j\pi/2$.

The A/D sampling clock is assumed to be phase locked to the 3$f_H$ pilot tone in the input signal. The sampling clock can be generated using a PLL as explained with reference to FIG. 5. Once phase and frequency lock with the pilot tone is achieved, the masked signal can be demodulated by mixing it with $e^{-j\pi/2}$. The spectrums of the signal before and after the mixing operation are shown in FIGS. 9A and 9B, respectively.

Figure 9C:
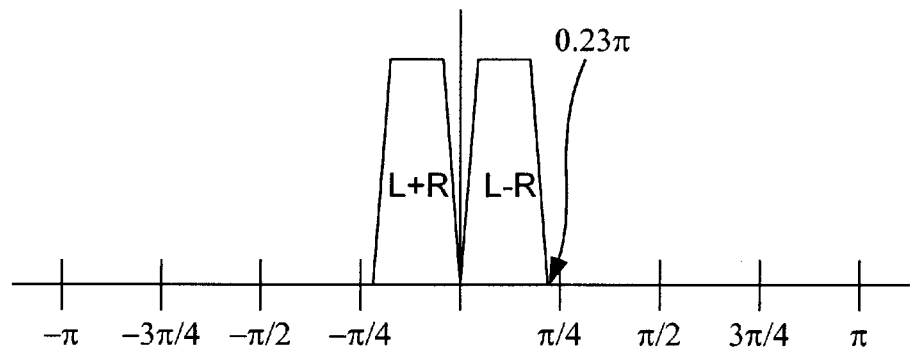
FIG. 9C shows a frequency spectrum of FIG. 9B after low-pass filtering.

The complex signal resulting from the mixing operation is filtered using lowpass filters 804 and 814 ($\omega_p$=0.23π, $\omega_c$=0.25π), which corresponds to the location of the 3$f_H$ pilot tone. The spectrum of the resulting signal is shown in FIG. 9C. Note that the independent sideband signal has been isolated in FIG. 9C.

Figure 9D:
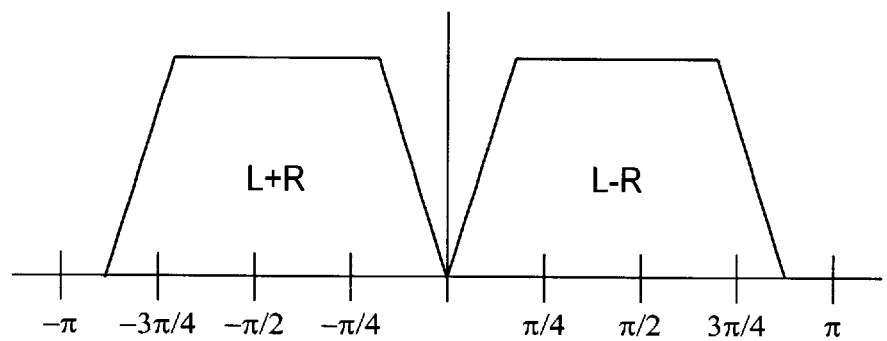
FIG. 9D shows a frequency spectrum of FIG. 9C after decimation by 4.

Because the signal at the input is oversampled, it is decimated by a factor of 4 in decimators 805 and 815, thereby reducing some computational burden in the elements that follow. The spectrum after decimation is shown in FIG. 9D.

The two sidebands of the ISB signal can then be isolated using Hilbert transformers. Let C represent the independent sideband signal, and I and Q represent the real and imaginary parts of C, respectively. Let $C_n$ represent the lower sideband of C, and let $C_p$ represent the upper sideband of C. Both $C_n$ and $C_p$ are analytic signals which can be separated using the following relationships:

$$C_n = C - jC_h = (I+jQ) - j(I_h+jQ_h) \quad (9a)$$

$$= (I+Q_h) + j(Q-I_h) \quad (9b)$$

$$C_p = C + jC_h = (I+jQ) + j(I_h+jQ_h) \quad (9c)$$

$$= (I-Q_h) + j(Q+I_h) \quad (9d)$$

Figure 9E:
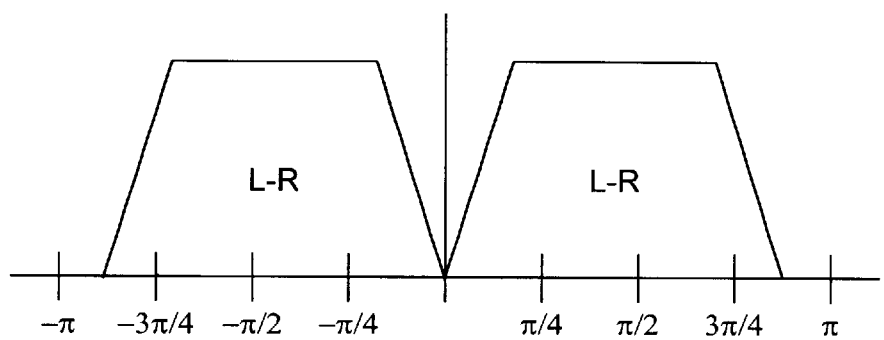
FIG. 9E shows the recovered upper sideband.
Figure 9F:
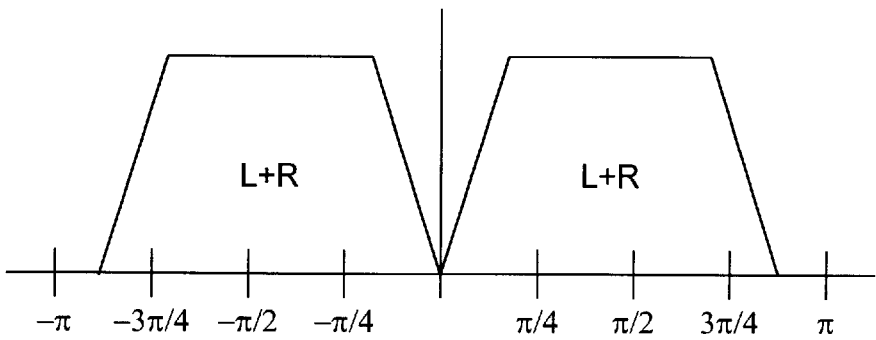
FIG. 9F shows the recovered lower sideband.

$I_h$ and $Q_h$ are Hilbert transformed versions of I and Q, respectively. The L+R signal can be recovered by taking the real part of $C_n$. Similarly, the L–R signal can be recovered by taking the real part of $C_p$. The frequency response of the recovered L+R signal is shown in FIG. 9F. The frequency response of the recovered L–R signal is shown in FIG. 9E. The Hilbert transformer 816 shown in the circuit of FIG. 8 is the same as those in the circuit of FIG. 6, as is delay element 806.

Figure 9G:
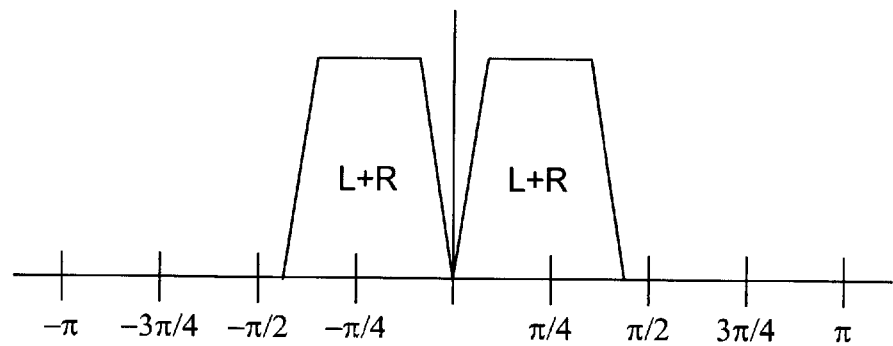
FIG. 9G shows the lower sideband after interpolation.
Figure 9H:
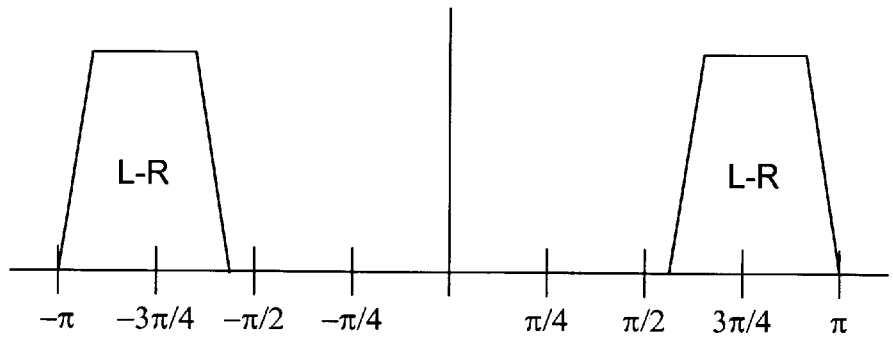
FIG. 9H shows the upper sideband after rate-expansion and highpass filtering.
Figure 9I:
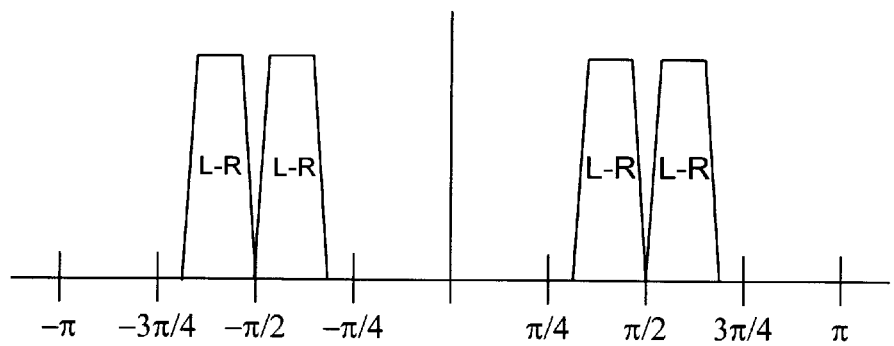
FIG. 9I shows the upper sideband after rate expansion and delaying by M3 units.
Figure 9J:
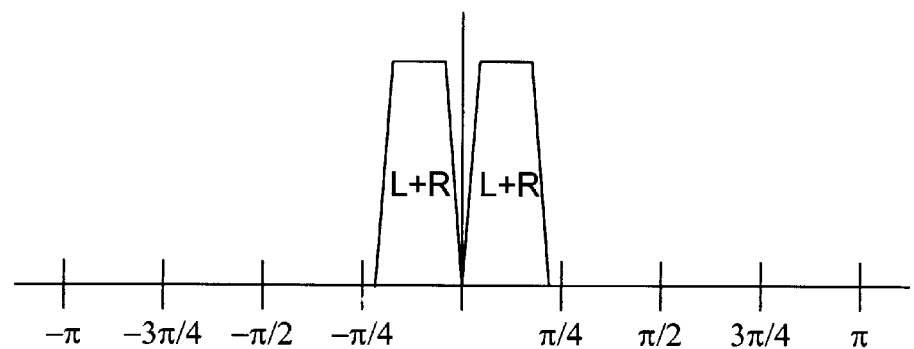
FIG. 9J shows the signal of FIG. 9G after interpolation by 2.

The L+R and L–R signals are then processed to generate a BTSC signal. The first part of this processing involves interpolation by two. The L+R signal is interpolated by inserting zeros between each sample (rate expander 808) followed by lowpass filtering in LPF 809 which is preferably of a high order because of the narrow transition band. The frequency response of the signal at the output of LPF 809 is shown in FIG. 9G. The interpolated L+R signal is again interpolated by two in expander 821 and filtered in LPF 822 ($\omega p=0.23\pi$, $\omega=0.75\pi$, gain=2). The resulting frequency response is shown in FIG. 9J.

The L–R signal is interpolated and modulated by $\cos(\pi n)$ in the same step. First, zeros are inserted between samples of the L–R signal (expander 818), and the resulting signal is high pass filtered in HPF 819 ($\omega_c=0.5\pi, \omega_p=0.46\pi$, gain=2). The resulting signal is rate expanded in element 820, and the expanded signal is delayed by M3 samples in delay element 829, where M3 is the group delay of the interpolation filter used to filter the L+R signal. The resulting spectrum is shown in FIG. 9I. Alternatively, the L–R signal could have been interpolated by 4, just as with the L+R signal, and then mixed with $\cos(\pi/2n)$.

Figure 9K:
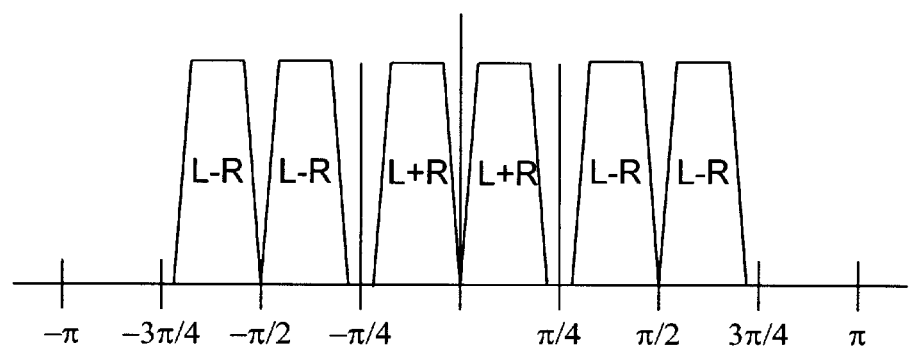
FIG. 9K shows the regenerated BTSC signal.
Figure 9L:
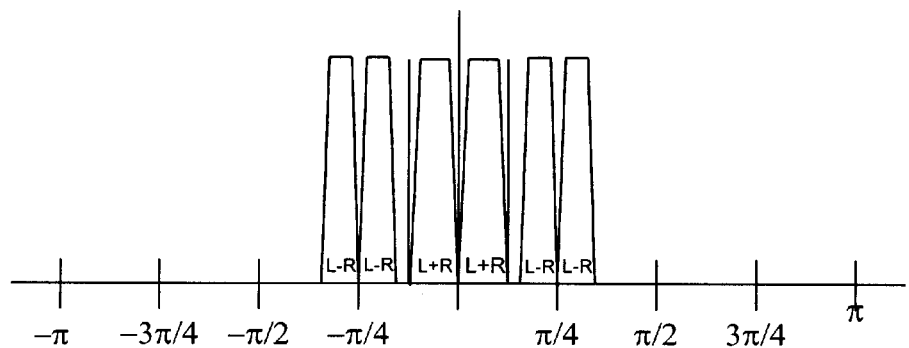
FIG. 9L shows the BTSC signal after interpolation by 2.

The interpolated L+R signal and the interpolated and AM modulated L–R signal are added to each other in summer 823, and a pilot tone at $f_H$ is added. The BTSC signal is thus regenerated. The frequency response is shown in FIG. 9K.

The next step, as in the masking circuit, is interpolation and predistortion. A 12 bit D/A converter 827 can be used to convert the signal back into the continuous time domain. The LPF 828 after D/A 827 serves as a reconstruction filter. Like the A/D clock, the D/A clock should be phase-locked with the $3f_H$ carrier in the input signal.

Figure 10:
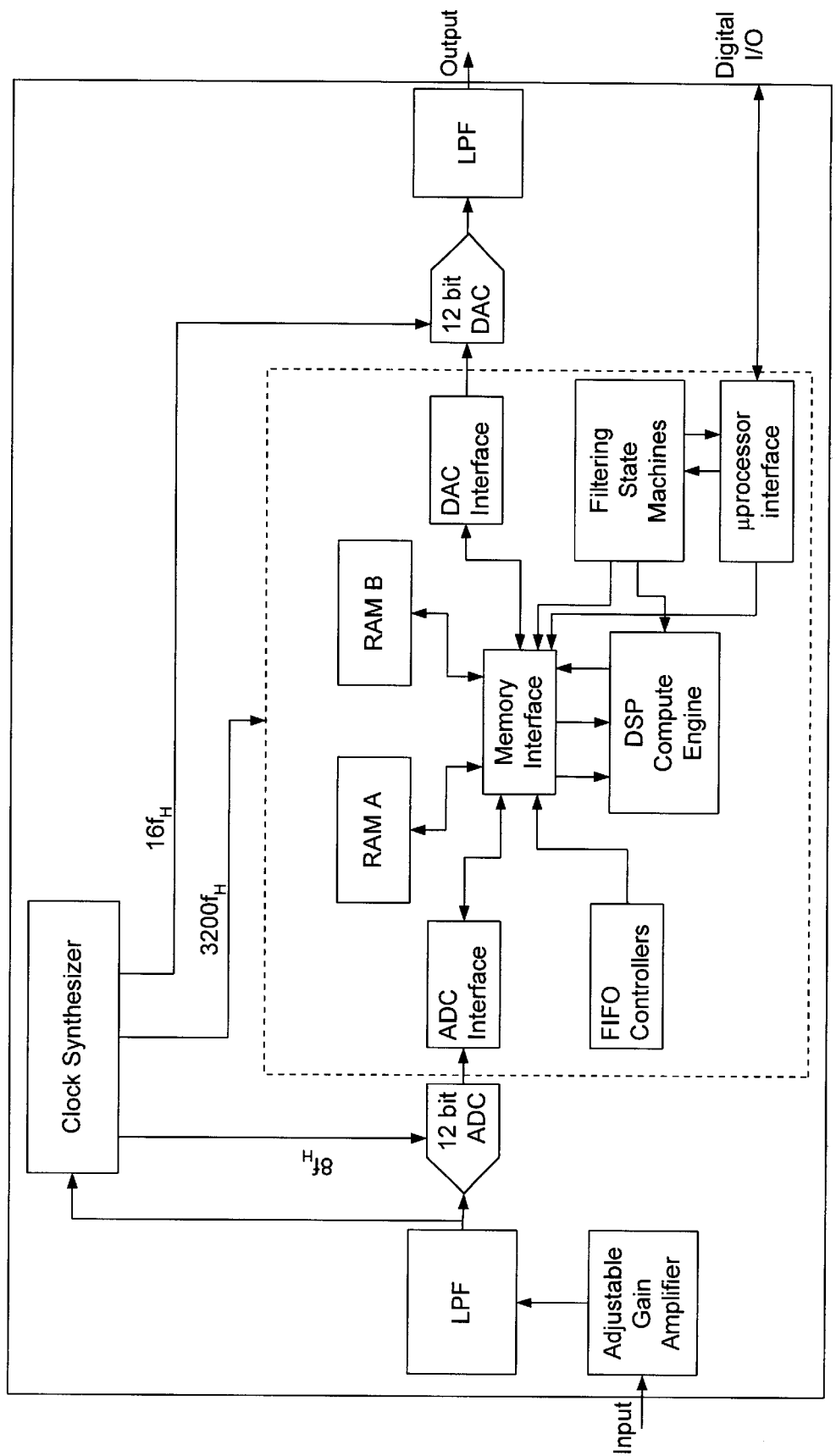
FIG. 10 shows one possible design for an audio demasking ASIC.

FIG. 10 is a block diagram for an ASIC which performs the audio demasking operation under microprocessor control. The ASIC includes analog anti-aliasing and reconstruction filters and a dual-loop clock synthesizer for generating all the clocks needed for on-chip operation. A 12 bit successive approximation 130 KS/sec A/D converter and a 12 bit 260 KS/sec D/A converter are also included. The digital portion of the ASIC takes advantage of a high speed clock (50 MHZ) and a DSP engine which can be time-shared between different filtering operations for optimal performance. Filter coefficients can be stored in an integrated ROM.

It is apparent that many modifications and variations of the present invention are possible, and references to specific values are by example only. For example, various method steps of the invention may be practiced in a different ordered sequence from that illustrated without departing from the scope of the invention. Moreover, it will be appreciated that references to L+R and L–R signals, where designated "first" and "second" audio components in the claims, can of course be reversed in designation to achieve the same effect and, therefore, references to "first" and "second" should not be deemed to limit the scope of the claims. It is, therefore, to be understood that within the scope of the appended claims the invention may be practiced otherwise than as specifically described.

What is claimed is:

1. A method of transmitting stereo audio information across a distribution medium, the stereo audio information comprising a first audio component corresponding to a sum (L+R) of a left channel audio and a right channel audio signal, and a second audio component corresponding to a difference (L–R) between the left channel audio signal and the right channel audio signal, the method comprising the steps of:

(1) subtracting the first audio component from the second audio component to produce a difference signal and passing the difference signal through a Hilbert transformer to produce a transformed difference signal;

(2) using the transformed difference signal and the first audio component summed with the second audio component to modulate a carrier signal to produce an independent sideband (ISB) modulated signal comprising upper and lower sidebands one corresponding to the first audio component and the other corresponding to the second audio component; and introducing the independent sideband modulated signal into a distribution medium.

2. The method of claim 1, further comprising the step of, prior to step (1), demodulating a Broadcast Television Standards Committee stereo audio signal into a baseband L+R signal and a baseband DBX encoded L–R signal.

3. The method of claim 1, further comprising the step of, prior to step (2), combining the modulated signal with a video signal.

4. The method of claim 1, further comprising the step of, at a receiving end of the distribution medium, demodulating the modulated signal using ISB demodulation.

5. The method of claim 1, wherein step (2) comprises the step of introducing the modulated signal into a cable TV network.

6. The method of claim 1, further comprising the step of adding a jamming signal to the modulated signal at a frequency location normally used for a stereo pilot tone.

7. The method of claim 1, wherein step (1) comprises the step of creating in a frequency band between $f_H$ and $2f_H$ a lower sideband corresponding to the first audio component and creating in a frequency band between $2f_H$ and $3f_H$ an upper sideband corresponding to the second audio component, where $f_H$ is the horizontal scanning frequency of a television signal.

8. Apparatus for generating an amplitude-modulated independent sideband signal from a first signal comprising a sum (L+R) of a left and right stereo audio signal and a second signal comprising a difference (L–R) of the left and right stereo audio signals, the apparatus comprising:

an in-phase signal generation circuit which generates an in-phase signal component from a sum of the first signal and the second signal;

a quadrature signal generation circuit which generates a quadrature signal component by performing a Hilbert transformation, the quadrature signal generation circuit comprising a first summer that subtracts the first signal from the second signal to produce a difference signal, and a Hilbert transformer that receives the difference signal, and performs a Hilbert transformation; and an output summing circuit, coupled to the in-phase signal generation circuit and the quadrature signal generation circuit, which combines the in-phase and quadrature signal components to produce the amplitude-modulated independent sideband signal comprising a first independent sideband containing information from the first signal and a second independent sideband containing information from the second signal.

9. The apparatus of claim 8, wherein the in-phase signal generation circuit comprises a second lowpass filter which low-pass filters the second signal, a second summer which adds the first and second signals, an a delay element coupled to the output of the second summer which delays the output of the second summer by an amount corresponding to that imposed by the Hilbert transformer.

10. The apparatus of claim 8, further comprising a jamming signal generator which injects a jamming signal into a frequency space normally occupied by a stereo pilot signal.

11. The apparatus of claim 8, further comprising a second Hilbert transformer coupled between the quadrature generation circuit and the output summer.

12. The apparatus of claim 8, wherein the first independent sideband is located in frequency between $f_H$ and $2f_H$ and the second independent sideband is located in frequency between $2f_H$ and $3f_H$, where $f_H$ is a horizontal scanning frequency of a television signal.

13. A system for transmitting masked stereo audio signals, comprising:

a headend comprising an audio masking circuit which generates a modulated signal comprising a first independent sideband containing information from a L+R stereo signal and a second independent sideband containing information from a L−R stereo signal, the audio masking circuit comprising an in-phase signal generation circuit which generates an in-phase signal component from a sum of the first signal and the second signal;

a quadrature signal generation circuit which generates a quadrature signal component by performing a Hilbert transformation, the quadrature signal generation circuit comprising a first summer that subtracts the first signal from the second signal to produce a difference signal, and a Hilbert transformer that receives the difference signal, and performs a Hilbert transformation; and an output summing circuit, coupled to the in-phase signal generation circuit and the quadrature signal generation circuit, which combines the in-phase and quadrature signal components to produce the modulated signal;

a signal distribution network coupled to the headend; and at least one settop terminal, coupled to the signal distribution system, comprising an audio demasking circuit which demodulates the first and second independent sidebands from the modulated signal and provides as an output a stereo signal compatible with the Broadcast Television Standards Committee signal format, the audio demasking circuit comprising a quadrature settop component circuit which generates a quadrature settop component from the modulated signal, the quadrature settop component circuit comprising a Hilbert transformer;

an in-phase settop component circuit which generates an in-phase settop component from the modulated signal and delays the in-phase settop component by an amount equivalent to the delay imposed by the Hilbert transformer; and a settop summing circuit, coupled to the quadrature settop component circuit and the in-phase settop component circuit, which sums the quadrature component and the delayed in-phase settop component.

14. The system according to claim 13, wherein the first independent sideband is placed in frequency between $f_H$ and $2f_H$ and the second independent sideband is placed in frequency between $2f_H$ and $3f_H$, where $f_H$ is a horizontal line scanning frequency for a television signal.

15. The system according to claim 14, wherein the audio masking circuit introduces a jamming signal in a frequency range normally used for a stereo pilot tone.

* * * * *

UNITED STATES PATENT AND TRADEMARK OFFICE
CERTIFICATE OF CORRECTION

PATENT NO.   : 6,272,226 B1
DATED        : August 7, 2001
INVENTOR(S)  : Khan et al.

Page 1 of 1

It is certified that error appears in the above-identified patent and that said Letters Patent is hereby corrected as shown below:

Column 5,
Line 6, delete "anti-aliaing" and insert therefore -- anti-aliasing --
Line 55, delete "n 0." and insert therefore -- n≠0. --

Column 6,
Line 30, insert a comma after "$B_p$"

Column 7,
Line 27, delete "($\omega_p$=0.46$\omega$, $\omega_c$=0.5π, gain=2)." and insert therefore
-- ($\omega_p$=0.46π, $\omega_c$=0.5π, gain=2). --

Column 8,
Line 3, delete "π=3π/4" and insert therefore -- ω=3π/4 --

Column 9,
Line 30, delete "(ωp=0.23π, ω=0.75π, gain=2)." and insert therefore
-- "(ωp=0.23π, ωc=0.75π, gain=2). --

Column 10,
Line 31, insert a paragraph between "and" and "introducing" and add "(3)" before "introducing"

Column 11,
Line 16, delete "an" and insert therefore -- and --

Signed and Sealed this

Twenty-first Day of May, 2002

*Attest:*

*Attesting Officer*

JAMES E. ROGAN
*Director of the United States Patent and Trademark Office*